Aug. 24, 1926.
E. C. VON GLAHN
1,597,639
POWER SCOOTER
Filed Feb. 9, 1926
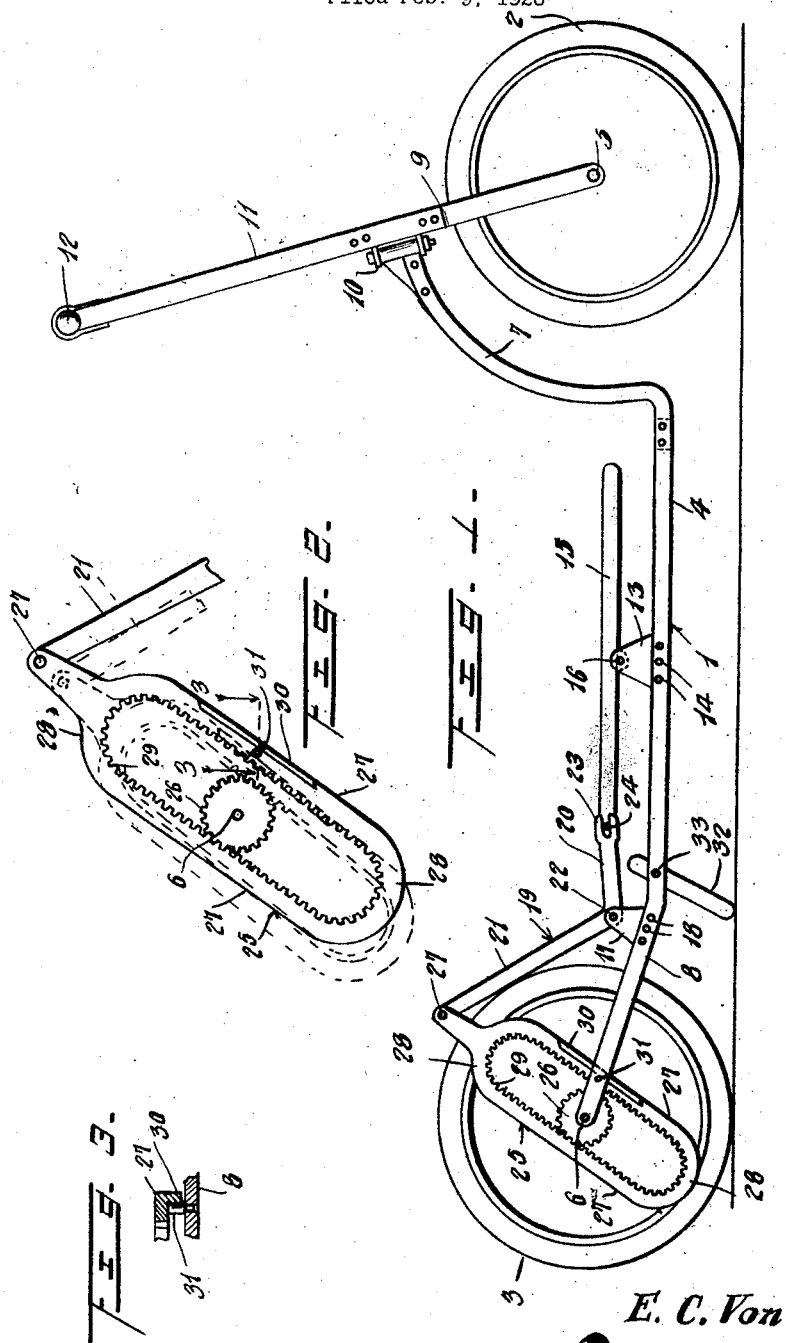
Inventor
E. C. Von Glahn,
By
Attorney Patented Aug. 24, 1926.

1,597,639

UNITED STATES PATENT OFFICE.

ELMER C. von GLAHN, OF CORCORAN, CALIFORNIA.

POWER SCOOTER.

Application filed February 9, 1926. Serial No. 87,070.

This invention relates to toy vehicles of that type known as scooters, and has for one of its objects the provision of a novel, simple and durable device of this kind that can be readily and rapidly propelled by a child occupying a standing position thereon, the invention comprehending a propelling mechanism embodying a pinion fixed to the drive wheel of the device, an endless rack associated with the pinion, a lever pivoted to the frame of the device and connected to the rack, a foot board rockably supported by the frame and connected to the lever, and means for alternately moving and holding the opposite sides of the rack in engagement with the pinion.

The invention is hereinafter fully described and claimed, and illustrated in the accompanying drawing, wherein:

Figure 1 is a view in side elevation of a vehicle or scooter constructed in accordance with my invention, Figure 2 is a detail view in side elevation of the pinion and endless rack, and Figure 3 is a detail sectional view taken on the plane indicated by the line 3—3 of Figure 2.

Corresponding and like parts are referred to in the following description, and designated in the several views of the accompanying drawing, by similar reference characters.

The scooter comprises a frame 1, a front or steering wheel 2 and a rear or driving wheel 3. The frame 1 has a horizontal portion 4 which is located below the front axle 5 and rear axle 6, an upwardly and forwardly curved front bar 7 and an upwardly and rearwardly inclined rear fork 8. A front fork 9 which embraces the steering wheel 2 and is connected to the front axle 5, is pivotally connected as at 10 to the upper end of the frame bar 7. A steering bar 11 extends upwardly from the front fork 9 and is provided at its upper end with a handle 12. The rear or frame fork 8 embraces the driving wheel 3 and has the rear axle 6 connected thereto.

Brackets 13 are secured to and extend upwardly from the opposite sides of the horizontal portion of the frame 1. These parts are secured to the frame portion 4 centrally between the ends of the latter by rivets 14 or other suitable elements. A foot board 15 is pivoted centrally between its ends to and between the brackets 13 by a shaft 16. A bracket 17 is secured to the frame fork 8 by rivets 18 or other suitable elements. This bracket extends upwardly from the frame fork 8 and is located adjacent the front end thereof. An angle lever 19 comprising a forwardly extending short arm 20 and an upwardly and rearwardly extending long arm 21, is pivoted at the juncture of the arms to the bracket 17. A bolt 22 or other suitable element pivotally connects the lever 19 to the bracket 17. The front end of the lever arm 20 is forked as at 23 for the reception of a pin 24 carried by the foot board 15. An endless rack 25 associated with a pinion 26 fixed to the driving wheel 3, is pivotally connected as at 27 to the upper end of the lever arm 21. The rack 25 consists of two parallel sides 27 and arcuate ends 28, the inner or opposing faces of these parts being provided with teeth 29. The rack 25 is supported in an upwardly and forwardly inclined position, and is adapted to be moved upwardly and downwardly through the medium of the foot board 15 and lever 19. The rack 25 gravitates in the direction of the pinion 26 and during its up-stroke its front side and during its down-stroke its rear side is held in engagement with the pinion 26 by a rib 30 on the outer face of the front side and a pin 31 carried by the frame fork 8. During the up-stroke of the rack 25, the pin 31 contacts with the rear side of the rib 30, and during the down-stroke of the rack the pin contacts with the front side of the rib.

From the foregoing and the accompanying drawing, it will be understood that a child standing on the foot board 15 and alternately shifting its weight from one side to the other of the platform pivot 16 will reciprocate the rack 25 and that as the result of a continuous rotation will be imparted to the drive wheel 3. The child can readily support himself upon the foot board 15 by means of the handle 12 and can readily turn the front wheel 2 to effect the steering of the scooter. When not in use, the scooter is supported by a stand 32 which is pivoted as at 33 to the frame portion 4 and which may be of any well known or appropriate construction.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:—

1. A scooter comprising a wheel supported frame, a pinion fixed to one of the wheels, a foot board pivoted to the frame, a lever pivoted to the frame and pivotally connected to the foot board, an endless rack pivotally connected to the lever and associated with the pinion, and means for alternately moving opposite sides of the rack into engagement with the pinion.

2. A scooter comprising a wheel supported frame, a pinion fixed to one of the wheels, a foot board pivoted between its ends to the frame, an angle lever pivoted to the frame and pivotally connected to the foot board, an endless rack pivoted to the lever and cooperating with the pinion, and means for alternately moving opposite sides of the rack into engagement with the pinion.

3. A scooter comprising a frame, a driving and a steering wheel supporting the frame, said frame having a portion located below the axles of the wheels, a pinion fixed to the driving wheel, a foot board pivotally secured between its ends to said portion of the frame, a lever pivoted to said portion of the frame and provided with a forwardly extending short arm pivotally connected to the foot board and an upwardly extending long arm, an endless rack pivotally connected to the long arm and lever and associated with the pinion, and means for alternately moving opposite sides of the rack into engagement with the pinion.

In testimony whereof I affix my signature.

ELMER C. von GLAHN.